United States Patent [19]
Brandreth

[11] 3,903,012
[45] Sept. 2, 1975

[54] WATER-DISPLACEMENT COMPOSITIONS CONTAINING FLUORINE COMPOUND AND SURFACTANT

[75] Inventor: Dale A. Brandreth, Huckessin, Del.

[73] Assignee: E. I. Du Pont de Nemours and Company, Wilmington, Del.

[22] Filed: Feb. 14, 1973

[21] Appl. No.: 332,503

[52] U.S. Cl. .......................... 252/194; 8/142; 34/9; 134/40; 148/6.14 R; 252/171; 252/364
[51] Int. Cl.² ...................... D06L 1/02; C09K 3/00
[58] Field of Search ............... 252/194, 171, 364; 148/6.14 R; 34/9; 8/142; 134/40

[56] References Cited
UNITED STATES PATENTS

| | | | |
|---|---|---|---|
| 3,042,479 | 7/1962 | Lawrence et al. | 8/142 |
| 3,336,232 | 8/1967 | Bauer et al. | 252/153 |
| 3,397,150 | 8/1968 | Burt et al. | 252/194 |
| 3,509,061 | 4/1970 | Zusman et al. | 252/171 |

FOREIGN PATENTS OR APPLICATIONS

| | | |
|---|---|---|
| 1,937,272 | 4/1970 | Germany |
| 2,040,233 | 1/1971 | France |
| 2,202,928 | 8/1972 | Germany |

Primary Examiner—Benjamin R. Padgett
Assistant Examiner—Irwin Gluck
Attorney, Agent, or Firm—James A. Costello

[57] ABSTRACT

Disclosed herein are water-displacement liquid compositions useful for drying water-wet articles. The compositions comprise particular fluorine-containing compounds having from about 0.01 to 5 percent by total weight of one or more selected surfactants dissolved therein.

36 Claims, 1 Drawing Figure

WATER-DISPLACEMENT COMPOSITIONS CONTAINING FLUORINE COMPOUND AND SURFACTANT

BACKGROUND OF THE INVENTION

1. Field of the Invention

This invention concerns the displacement of water with or without solutes or suspensoids therein from the surfaces of articles to be dried. Displacement is effected by a fluorinecontaining liquid or combination thereof having dissolved therein one or more selected surfactants.

2. Description of the Prior Art

It is known to dry water-wet articles by processes comprising the contacting of such articles with dense waterimmiscible organic liquids, optionally containing a surfactant, thus to displace the water from the surface of the articles and to float the water to the surface of the liquid. The immiscible liquid is often agitated by boiling or by mechanical means.

Burt et al. disclosed in U.S. Pat. No. 3,397,150 a liquid comprising 1,1,2-trichloro-1,2,2-trifluoroethane and, dissolved therein, a mixture of mono- and dialkylphosphates neutralized with saturated mono-, di-, and trialkylamines for the noncontinuous displacement of water from the surface of articles, for example, by spraying.

Steinacker disclosed in U.S. Pat. No. 3,386,181 a device and process for displacing water from the surface of articles in a continuous manner. In brief, the Steinacker process comprises contacting the articles with a dense waterimmiscible displacement liquid, by immersion of the articles in a turbulent zone of a bath, allowing the displaced water to float to the surface of the displacement liquid in a quiescent zone in the same bath, and thereafter removing the displaced water from the displacement liquid in the liquid phase. Steinacker's preferred displacement liquid is the mixture of Burt et al.

Languille et al. disclosed, in French Pat. No. 2,040,733, mixtures consisting of 1,1,2-trichloro-1,2,2-trifluoroethane and surfactants of the type of N-oleyl propylenediamine dioleate. Figiel, in U.S. Pat. No. 3,559,297, disclosed a 1,1,2-trichloro-1,2,2-trifluoroethane displacement liquid in which water is made soluble to the extent of 0.1 to 5 percent by mixing small amounts of water-miscible organic liquids, such as lower alcohols, with the water-immiscible solvent. A drying process which utilizes the compositions of Figiel is normally operated in a nonequilibrium manner because the water-miscible liquid, which is necessary to operability, normally distributes between the solvent and the water phases and is thus lost from the solvent displacement liquid. The drying capacity of a composition of this type is therefore much lower than is the capacity of the displacement drying compositions herein.

Liquids which operate to dry the surface of articles by solubilization of water as opposed to displacement have also been disclosed; i.e., they form thermodynamically stable dispersions of water in hydrophobic solvents. Examples of such liquids are 1,1,2-trichloro-1,2,2-trifluoroethane solutions of certain amine salts of an alkylbenzenesulfonic acid, as disclosed, for example, by Lawrence, Jr. et al. in U.S. Pat. No. 3,042,479, by Bauer et al. in U.S. Pat. No. 3,336,232, and by Clementson in German preliminary publication No. 1,937,272. Liquids of this kind tend to solubilize water along with any solute in the water sometimes leaving a conductive or corrosive salt on the surface of the dried articles. As the solubilized water concentration rises in such compositions, their drying effectiveness decreases. Normally, water separation must be forced to occur, frequently by addition of large amounts of salt. This regeneration procedure is both inefficient and amounts to insuring the replenishment of impurities of the type found in electrically conductive and visible spots on dried objects.

SUMMARY OF THE INVENTION

The novel liquid water-displacement compositions of this invention comprise

A. a fluorine-containing compound havine i) solubility parameter less than about 8, ii) density of at least about 1.3 g/cc at room temperature, and iii) a boiling point above about 20°C., and B. a surfactant dissolved in (A) to the extent of about 0.01 to 5 percent by weight of the combination, said compositions characterized by an interfacial tension with water of up to about 6 dynes/cm and water-solubilizing capability of less then about 750 ppm.

It is most preferred to employ surfactants at concentrations near the lower end of the range of 0.01 to 5 weight percent, especially wnen surfactant residues are least desirable. At the same time, it should be appreciated that the interfacial tension is decreased by increasing the surfactant concentration.

Although not intended to limit the scope of this invention, the following explanation is hypothesized to show that water displacement as envisioned herein, does not involve wetting phenomena primarily. The explanation is based upon the system wherein a drop of water rests on a plate and is surrounded by a dense composition of this invention. The density difference of the two phases tends to cause the drop to float away from the surface. The adhesive forces (surface forces) cause the drop to stick. The interfacial tension between the drop and the displacement liquid tends to make the drop spherical. For high-interfacial tension, low-density difference systems, the drop becomes a section of a sphere. As the density difference increases, and the interfacial tension decreases, the drop becomes elongated to the point that if the limiting parameters are exceeded most of the drop will break away and float to the surface.

The art teaches that water displacement, by dense liquids containing surfactants function by adsorption of the surfactant at solid surfaces to render them nonwettable by water. The water rises and forms a separable layer. The invention compositions do not render solid surfaces significantly less water wettable than art compositions but are superior in water displacing (i.e. drying) ability. Invention compositions are uniquely definable by their low interfacial tension as measured by the test procedure outlined herein. This property is the most critical one in defining superior performing compositions. Water solubilization, density, boiling point, and inertness of the fluorocarbons are less important but necessary for practical operation. Other factors such as wettability, permissibile salt concentration (ionic strength), or intensity of agitation are of minor concern and need not be specified to define operability; their total effect on invention compositions is to alter only marginally the limits of interfacial tension and water solubilization.

BRIEF DESCRIPTION OF THE DRAWING

The FIGURE presents a plot of interfacial tension versus water displacement for 18 surfactant/solvent combinations. The solvent in all cases was 1,1,2-trichloro-1,2,2-trifluoroethane. The surfactants are as set out in Table 1 below. The Figure portrays the surprising relationship between the interfacial tension and the water displacement index. The water displacement indices of the compositions of this invention represented in the Figure are above 80 percent. A water displacement index above about 80 percent is characteristic of all the novel compositions disclosed herein when measured according to the test procedure outlined below under the heading "Water Displacement Index."

It should be noted in connection with the determination of the water displacement index values included in the Figure, that surfactant concentration was 0.5 weight percent and that this higher surfactant concentration actually favors the showing of the prior art compositions set out in the Figure. (See text under heading "Water Displacement Index" and see Example 15, Part C).

TABLE 1

Figure 1:
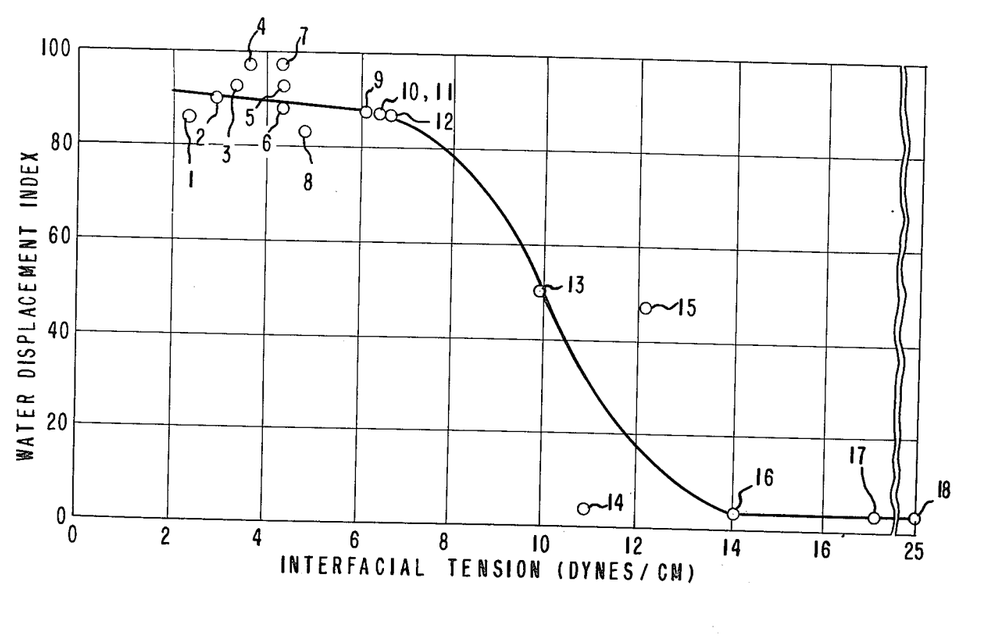

| Example No. or Comparison Letter Used Herein | No. Designation on Figure | Surfactant Structure | Type | Interfacial Tension (dynes/cm.) | Water Displacement Index |
|---|---|---|---|---|---|
| Example 33 | 1 | $F(CF_2CF_2)_{2-8}CH_2CH_2O(CH_2-CH_2O)_{20}H$ | Nonionic | 2 | 87 |
| Example 2 | 2 | $C_{17}H_{33}-C\begin{smallmatrix}N----CH_2\\ \\ N----CH_2\\ \\ CH_2CH_2OH\end{smallmatrix}$ | Cationic | 3 | 90 |
| Example 14 | 3 | $C_{17}H_{33}CONH(CH_2)_2NH(CH_2)_2OH$ | Cationic | 3 | 82 |
|  | 4 | Dioctyl ester of sodium sulfosuccinic acid | Anionic | 4 | 97 |
|  | 5 | $\left[C_{17}H_{31-35}-C\begin{smallmatrix}N----CH_2\\ \\ N----CH_2\\ / \backslash\\ H \quad CH_2CH_2OH\end{smallmatrix}\right]$ $[C_{17}H_{31-35}COO]-$ | Cationic | 4 | 93 |
| Example 35 | 6 | Poly(oxyethylene, propylene)-polyol | Nonionic | 4 | 87 |
| Example 26 | 7 | $[i-C_8H_{17}O(CH_2CH_2O)_2]_{1.5}PO-_{2.5}-$ $[n-C_8H_{17}NH_3]^+_{1.5}$ | Anionic | 4 | 97 |
| Example 32 | 8 | Block copolymer comprising poly dimethyl siloxane blocks and poly(oxyalkylene) blocks | Nonionic | 5 | 83 |
| Example 34 | 9 | $H(OCH_2CH_2)_{5.0}(OCH(CH_3)CH_2)_{30.1}-$ $(OCH_2CH_2)_{5.0}OH$ | Nonionic | 6 | 87 |
| Example 37 | 10 | $F[CF(CF_3)CF_2O]_2CF(CF_3)CONH-$ $(CH_2)_3N^+(CH_2)_3COO-$ | Amphoteric | 6 | 87 |
| Example 31 | 11 | Block copolymer comprising poly(dimethyl siloxane) blocks and poly(oxyalkylene) blocks | Nonionic | 6 | 87 |
| Comparison C | 12 | $C_{17}H_{31-35}\overset{+}{N}HCH_2CH_2CH_2\overset{+}{N}H_2$ dioleate | Cationic | 7 | 87 |
| Comparison R | 13 | $H(OCH_2CH_2)_{2.2}(OCH(CH_3)CH_2)_{30.1}-$ $(OCH_2CH_2)_{2.2}OH$ | Nonionic | 10 | 50 |
| Comparison E | 14 | 2-Ethylhexyl-ammonium mono- and dioctyl phosphates | Anionic | 11 | <3 |
| Comparison L | 15 | Isopropylammonium dodecylbenzene sulfonate | Anionic | 12 | 47 |
| Comparison G | 16 | $(C_{13}H_{27}O)_{1.5}PO_{2.5}(n-C_8H_{17}NH_3)_{1.5}$ | Anionic | 14 | <3 |
|  | 17 | Perfluorooctanoic acid salt of $RNH_2$ where R is a mixture of 4% $C_{14}H_{29}$, 12% $C_{16}H_{33}$, 2% $C_{18}H_{37}$, 75% $C_{18}H_{35}$, 7% $C_{18}H_{33}$ | Cationic | >17 | <3 |
|  | 18 | Perfluorooctanoic acid salt of $R_1R_2NH$ where $R_1$ and $R_2$ are alkyl groups consisting of 10% $C_{18}H_{37}$ and 90% $C_{20-22}H_{41-45}$ | Cationic | >25 | <3 |

DETAILS OF THE INVENTION

The particular utility of the invention combinations derives from selected fluorine-containing liquids, because of their stability and more especially their inertness toward substrates, for example polymeric materials such as plastics and paints. The contemplated liquids are definable in this property by means of the so-called Hildebrand solubility parameter. This parameter, useful for relating solvent aggressiveness toward polymers and solubility, has acquired a status in the art. For example, Small described such a relationship in J. Appl. Chem. 3 71 (1953). According to this property, operable fluorine-containing liquids have solubility parameters of about 8 or less. The limitation excludes such aggressive fluorine-containing solvents as hexafluoroacetone. The parameter encompasses, among others, the following compounds:

| | Solvent | Solubility Parameter |
|---|---|---|
| 1) | $C_3F_7O(CF(CF_3)CF_2O)_nCFHCF_3$ wherein n = 1,2,3,4,5... | 5.5 – 6.5 |
| 2) | $CF_2—CF—CF_3$ $\|\quad\quad\|$ $CF_2—CF—CF_3$, and isomer | 5.6 |
| 3) | $CF_3CCl_2CF_3$ | 6.3 |
| 4) | $C_3F_7CFHCF_3$ | ~ 6.5 |
| 5) | $CF_3CCl_2CClF_2$ | 7.0 |
| 6) | $O\underset{CF_2—CF_2}{\overset{CF_2—CF_2}{<\quad\quad>}}N—CF_3$ | ~ 6.5 |
| 7) | $CF_3CFClCFClCF_3$ | ~ 7.0 |
| 8) | $O\underset{CF_2—CFCl}{\overset{CF_2—CFCl}{<\quad\quad\|}}$ | ~ 7.0 |
| 9) | $CFCl_2CF_2Cl$ | 7.2 |
| 10) | $CF_2—CFCl$ $\|\quad\quad\|$ $CF_2—CFCl$, and isomer | 7.0 – 7.5 |
| 11) | $CCl_3F$ | 7.5 |
| 12) | $CCl_2FCCl_2F$ | 7.9 (30°) |

The names of the compounds whose formulas are given above are as follows:

1. poly(hexafluoropropylene oxide), 1H-tetrafluoroethyl terminated
2. hexafluoro-1,2-bis(trifluoromethyl)cyclobutane and -1,3-isomer
3. 2,2-dichlorohexafluoropropane
4. Heptafluoropropyl 1H-tetrafluoroethyl ether
5. 1,2,2-trichloropentafluoropropane
6. Octafluoro-4-(trifluoromethyl)morpholine
7. 2,3-dichlorooctafluorobutane
8. 3,4-dichlorohexafluorotetrahydrofuran
9. 1,1,2-trichloro-1,2,2-trifluoroethane
10. 1,2-dichlorohexafluorocyclobutane and -1,3-isomer
11. trichlorofluoromethane
12. 1,1,2,2-tetrachloro-1,2-difluoroethane.

The most preferred solvent is $CFCl_2CF_2Cl$. All of the solvents useful herein are well-known in the art and are available commercially and/or preparable by means that will be known to those skilled in the art. A solvent density of at least about 1.3 g./cc is necessary in order quickly to float displaced water to the surface. A boiling point above about 20°C., or room temperature, is preferred for convenient operation of the novel process. Contemplated herein are mixtures of solvents and surfactants which have the critical properties set out.

In some otherwise useful combinations of one or a mixture of surfactants in one or a mixture of solvents, emulsions are sometimes formed with water. The emulsions, being thermodynamically unstable, as opposed to solubilized mixtures, separate into solvent and aqueous phases. However, they sometimes do so too slowly for practical use. It has been found that the addition of from about 0.2 to 5 percent by weight of a $C_1$ to $C_6$ mono- alcohol prevents the formation of the emulsion or hastens the separation of the phases thus making the compositions useful. The addition of the alcohols in this amount has little net effect on the interfacial tension of the combinations. As the alcohols are effectve in very low concentrations their depletion by distribution into the water phase, because it is asymptotic, does not impose serious limitations on the process.

In addition to the alcohols, the azeotrope of 1,1,2-trichloro-1,2,2-trifluoroethane and 4 weight percent ethanol can be employed as can a mixture containing about 3.75 weight percent of a mixture of about 91% ethanol and 9% methanol denaturant. Denatured ethanol containing the usual denaturants in the usual concentrations are generally operable. Usual denaturants are alcohols such as methanol, menthol, glycerol and butanol; hydrocarbons such as benzene and gasoline; ketones such as camphor, acetone, methyl ethyl ketone; aldehydes such as acetaldehyde; alkaloids such as brucine; acids such as phthalic acid and their esters etc.

Since it can be undesirable to leave a surfactant residue on the dried articles, the dried articles can be rinsed after treatment by dipping or spraying them with pure solvent or by condensing vapors of the solvent on them, as is known in the art. To minimize surfactant residues left on the articles, it is perferred to use as little surfactant in the displacement liquid as is practical and in no case to exceed about 5 percent by weight.

Cationic Surfactants

Superior water displacement liquids are provided by solution in the disclosed fluorine-containing compounds of the imidazolines of the following formula, as their free bases, or as their mono- or dicarboxylate salts wherein $R^1$ is alkyl or alkenyl containing from about 10 to 20 carbon atoms, $R^2$ is hydroxyalkyl of the structure $—(CH_2)_nOH$, or amido-alkyl of the structure $—(CH_2)_nNHOCR^3$, $R^3$ is alkyl or alkenyl of from about 10 to 20 carbon atoms, and $n$ is an integer from about 2 to 6.

The cationic surfactants, thus, are selected from the group consisting of the imidazoline moiety as described above, that imidazoline moiety combined with one carboxylate moiety, and that imidazoline moiety combined with two carboxylate moieties.

The imidazoline derivatives wherein $R^1$ is alkyl or alkenyl are conveniently prepared by art known means. For example, those derivatives wherein $R^2$ is 2-hydroxyethyl can be prepared by reaction under reduced pressure between fatty acids or fatty esters of the structures $R^1COOH$ or $R^1COOR^4$, wherein $R^1$ has the above-defined structures and $R^4$ is lower alkyl, with N-(2-aminoethyl)ethanolamine under reduced pressure. The intermediate, N-(2-$R^1$-amidoethyl)ethanolamine is formed first, followed, under more severe conditions, by the imidazoline. Homologues are prepared in analogous processes by art-recognized methods.

The intermediate, N-(2-$R^1$-amidoethyl)ethanolamine, is also operable and within the definition of this invention, as will be shown in the Examples. The intermediate may also be formed in use by hydrolysis of the imidazoline. Possible hydrolytic degradation of the imidazoline in use is, for this reason, without effect on the operability of the liquid.

The preparation of such compounds is described, for example, by Johnson in Chemistry and Physics of Surface Active Substances Vol. 1, Gordon and Breach Science Publishers, New York (1967) pp. 155-171.

Similarly derivatives wherein $R^2$ is $—(CH_2)_nNOCR^3$ are prepared by reaction of $R^1COOH$ or $R^1COOR^4$, as defined above, with dialkylenetriamines of the structure $H_2N(CH_2)_2NH-(CH_2)_mNH_2$, wherein $m$ is normally 2 but can be as large as 6.

A preferred surfactant composition is that imidazoline derived from reaction between tall oil acids and diethylenetriamine, the derivative being in the form of the tall oil acid salt. As the tall oil acids are described empirically as $C_{17}H_{31-35}COOH$, $R^1$ in this composition is $C_{17}H_{31-35}—$ and $R^3$ is the same, and $R^2$ is $C_{17}H_{31-35}CONHCH_2CH_2—$.

Another preferred surfactant composition is derived from reaction between oleic acid and N-(2-aminoethyl)ethanolamine, the imidazoline being in the form of an oleic acid salt. The composition of the base has, therefore, the structure wherein $R^1$ is $CH_3(CH_2)_7CH=CH(CH_2)_7—$ and $R^2$ is $HOCH_2—CH_2—$. A most preferred water displacement liquid is a 0.06% by weight solution of the above surfactant containing from about 0.2 to 5 percent by weight ethanol. Several preferred cationic surfactants are given in Table 2 below.

Anionic Surfactants

Contemplated displacement liquids are also provided by solutions in the defined solvents of surfactants selected from within the classes of amine salts of mono- and di-alkyl poly(oxyalkylene) phosphates and alkaryl poly(oxyalkylene) oxyalkanesulfonic acids.

Preferred liquids are provided by solution of surfactants selected from the class of amine salts of mono- and dialkyl poly(oxyalkylene) phosphates. A particular preferred surfactant of this class is represented by the formula $[i-C_8H_{17}O(CH_2CH_2O)_2]_{1.5}PO^-{}_{2.5}[n-C_8H_{17}NH_3]^+{}_{1.5}$ wherein noninteger subscripts represent the average of the mixture of mono- and di-phosphates. A most preferred displacement liquid is a 0.064 wt. percent solution of said surfactant in 1,1,2-trichloro-1,2,2-trifluoroethane. Several representative anionic surfactants are set out in Table 3 below.

The disclosed surfactants are well known and are normally employed in aqueous solution. The amine salts of mono- and dialkyl poly(oxyalkylene) phosphates are prepared by amine neutralization of the mono- and di-alkyl poly-(oxyalkylene) phosphate esters prepared by esterification of the corresponding alcohols. The alcohols can be prepared by a method disclosed by Schuette et al. in U.S. Pat. No. 2,174,761. Alkaryl poly(oxyalkylene) oxyalkanesulfonic acids can be prepared according to the process disclosed by Bruson in U.S. Pat. Nos. 2,098,203 and 2,115,192.

In brief, the alcohols can be prepared by reacting an alcohol, from which the alkyl group of the product is derived, with ethylene oxide under pressure at a temperature of about 130° to 180°C.

The phosphate esters of the alcohol can be prepared by heating the alcohol with phosphoric anhydride. Intermediate alkaryl poly(oxyalkylene)oxyalkyl chlorides can be prepared by heating under reflux an alkylphenol with an excess of $\beta,\beta'$-dichlorodialkyl ether in the presence of 1 to 1.5 equivalents of an alkali metal hydroxide. The chloride is isolated and thereafter reacted with a metal sulfite such as sodium sulfite.

Nonionic, Amphoteric

Contemplated surfactants in this group are block copolymer structures comprising silicone polymer blocks and poly(oxyalkylene)blocks that confer the recited interfacial tension and water solubilization properties on the water displacement liquids. The contemplated poly(oxyalkylene) blocks contain about 2 to 4 carbons in their monomeric precursors. Examples of several representative surfactants from this group are provided in Table 4 below.

DESCRIPTION OF THE PREFERRED EMBODIMENTS

The following Examples are meant to illustrate but not to limit this invention. Percentages are by weight unless indicated to the contrary. Where measured, the interfacial tension, the water solubilization, and the water displacement index, were determined in accordance with the following test procedures. It should be understood that although surfactants and fluorine-containing compounds are described with whatever particularity is possible, such compositions may also contain minor amounts of impurities, denaturants, commercial adjuvants, etc. which do not interfere with the operation of the invention. Consequently, the description of the invention includes compositions having amounts of additives which do not adversely or beneficially affect the utility of the novel combinations of materials which form the water-displacement compositions of this invention.

Interfacial Tension

The method of measuring the interfacial tension between the immiscible fluorine-containing liquids and water was a pendant drop method. See generally, Fordham, Proc Roy Soc Ser. A 194 p. 1 et seq. (1948). Briefly, the experimental method consists in suspending a drop of the test liquid in water, and photographing the drop. Densities of the test liquid and water along with geometric parameters of the drop derived from the photograph are inserted into the equation of Fordham for calculation of the interfacial tension. By "interfacial tension" as used to characterize the novel compositions of this invention is meant the value of this property as determined by the pendant drop method outlined above run at 25°C. and at a surfactant concentration of 0.064 weight percent in 1,1,2-trichloro-1,2,2-trifluoroethane.

Water Solubilization Index

By water solubilization index is meant the amount of water solubilized in parts per million by weight of 1,1,2-trichloro-1,2,2-trifluoroethane having 0.16% weight percent surfactant concentration. It was measured as follows. Distilled water was titrated from a burette into a 100 ml. sample of liquid containing 0.16% by weight of a surfactant until a faint cloudiness of unsolubilized water persisted. When one drop of water was not solubilized to form a clear solution, the mixture was allowed to stand for at least an hour, whereupon the solvent layer was analyzed by the Karl Fischer method for water.

Water Displacement Index

This value is based upon a measurement of the displacement of water from the interstices between small glass spheres. Specifically, the value was measured as follows: 8.5 ml. of glass spheres of 470 micron diameter were placed in a 25 ml. graduated cylinder. Then, 3.0 ml. of water tinted with a water soluble dye was added to the spheres. This volume of water is just sufficient to fill the space between the spheres. The displacement liquid was added to the cylinder carefully so as not to disturb the spheres, in an amount sufficient to fill the cylinder to the 25 ml. mark. As water is displaced from the space between the spheres, and rises to the top of the cylinder, it collects as a separate phase. Measurement of the volume of water displaced was made after 5 minutes. The percent of water displaced was calculated by dividing the volume of collected water by the amount charged and multiplying by 100. This percentage is the water displacement index.

EXAMPLES 1 to 14 (Also Shows Comparison)

Table 2 shows interfacial tensions and water solubilizations for various of the compositions of this invention wherein the surfactants are of cationic type. Also included in the Table, and marked as such, are comparative values from the art. The surfactant concentration was 0.064 wt. percent in all instances when interfacial tension was being measured. The concentration of surfactant in fluorine-containing compound was maintained at 0.16 weight percent when water solubilization was being determined, with the exception that in Example 14 the concentration was 0.022 weight percent, the limit of surfactant solubility. A concentration of 0.064 weight percent surfactant corresponds to 1 gram of surfactant per liter of $CCl_2FCClF_2$.

TABLE 2

| Example or Comparison | Surfactant | Interfacial Tension (Dynes/cm) | Water Solubilization Index |
|---|---|---|---|
| Comparison A | No Surfactant | 45 | — |
| Example 1 | 1-(2-hydroxyethyl)-2-(-$C_{17}H_{33}$)-2-imidazoline mono oleate | 4 | 507 |
| Example 2 | 1-(2-hydroxyethyl)-2-(-$C_{17}H_{31-35}$)-2-imidazoline | 3 | <600 |
| Example 3 | 1-(2-hydroxyethyl)-2-(-$C_{17}H_{31-35}$)-2-imidazoline mono acetate | 3 | 67 |
| Example 4 | 1-(2-hydroxyethyl)-2-(-$C_{17}H_{31-35}$)-2-imidazoline mono n-octanoate | 2 | <385 |
| Example 5 | 1-(2-hydroxyethyl)-2-)-$C_{17}H_{31-35}$)-2-imidazoline di n-octanoate | 2 | <321 |
| Example 6 | 1-(2-hydroxyethyl)-2-(-$C_{17}H_{31-35}$)-2-imidazoline mono n-butyrate | 2 | <256 |
| Example 7 | 1-(2-hydroxyethyl)-2-(-$C_{17}H_{31-35}$)-2-imidazoline di n-butyrate | 2 | <256 |
| Example 8 | 1-(2-hydroxyethyl)-2-(-$C_{17}H_{31-35}$)-2-imidazoline mono n-heptanoate | 3 | <256 |
| Example 9 | 1-(2-hydroxyethyl)-2-(-$C_{17}H_{31-35}$)-2-imidazoline di n-heptanoate | 3 | <385 |
| Example 10 | 1-(2-hydroxyethyl)-2-(-$C_{17}H_{31-35}$)-2-imidazoline mono n-decanoate | 2 | <321 |
| Comparison B | 1-(2-hydroxyethyl)-2—$C_{17}H_{31-35}$)-2-imidazoline di n-decanoate | 2 | <769 |
| Example 11 | 1-(2-hydroxyethyl)-2-(-$C_{17}H_{31-35}$)-2-imidazoline mono n-laurate | 2 | <297 |
| Example 12 | 1-(2-hydroxyethyl)-2-(-$C_{17}H_{31-35}$)-2-imidazoline mono pelargonate | 2 | 182 |
| Example 13 | 1-($C_{17}H_{31-35}CONHCH_2CH_2$-)-2-($C_{17}H_{31-35}$)-2-imidazoline | 5 | <600 |
| Example 14 | $C_{17}H_{33}CONHCH_2CH_2NHCH_2CH_2OH$ | 3 | 155 |
| Comparison C | $C_{17}H_{33}H_2N(CH_2)_3NH_2$ Dioleate (Composition of Languille et al.) | 7 | 135 |
| Comparison D | $C_{12}H_{25}$—$C_6H_4$—$SO_3^-(CH_3)_2CNH_3^+$ (Composition of Bauer et al.) | 12 | 2,200 |
| Comparison E | 2-Ethylhexylammon. Mono-, Di-octyl Phosphates (Composition of Burt et al.) | 11 | 91 |
| Comparison F | $C_7F_{15}COOH$ (Composition of Zisman et al.) | 27 | 140 |

EXAMPLE 15 (Also Shows Comparison)

This Example in three parts compares the properties in the displacement of water from fritted glass, of a preferred composition of the invention consisting of 0.064 percent by weight of 1-(2-hydroxyethyl)-2-oleyl-2-imidazoline oleate (i.e. $R^1$ is $CH_3(CH_2)_7CH=CH(CH_2)_7$— and $R^2$ is $HOCH_2CH_2$—) in 1,1,2-trichloro-1,2,2-trifluoroethane, versus a composition of Languille et al.

Displacement liquids were prepared by dissolving $C_{17}H_{31-35}H_2N(CH_2)_3NH_2$ dioleate of Languille et al. and 1-(2-hydroxyethyl)-2-oleyl-2-imidazoline oleate of the instant invention in 1,1,2-trichloro-1,2,2-trifluoroethane to form separate solutions containing 0.064 percent by weight of the surfactants. The liquids were tested as described below.

A. Fritted glass disks of two porosities, coarse and medium, were wetted with deionized water and, in parallel experiments, were placed in the boiling displacement solutions for one minute and thereafter rinsed for 30 seconds in room temperature 1,1,2-trichloro-1,2,2-trifluoroethane, thus approximating a commercial process. The rinsed disks were thereafter transferred immediately to absolute methanol of known Karl Fischer water content to remove any water remaining in the fritted glass. The total amount of water in the methanol was then determined by the Karl Fischer method. By calculation of difference, the following results were obtained:

| Fritted Glass | Displacement Liquid | Water remaining in the Fritted Glass (grams) |
|---|---|---|
| Coarse | Art Composition | 0.179 |
| Coarse | Invention Composition | 0.021 |
| Medium | Art Composition | 0.123 |
| Medium | Invention Composition | 0.015 |

From the results, it is concluded that the composition of the invention left less than 1/8 as much water in the fritted glass as did the composition of Languille et al.

B. In the same manner, glass reed switch tubes (approx. 3.2 cm long, 4 mm outside dia.), a part used in telephone switching devices, were wetted with water, as is customary in the manufacture of the devices, and dried in parallel experiments by displacement in the same manner as in part A. The residual water left on the reed tubes was determined as pointed out in Part A above and was found to be:

| | Residual water (mg/tube) |
|---|---|
| Art Composition | 6.6 |
| Invention Composition | 0.23 |

The concentrations of water in the methanol correspond to 6.6 mg and 0.23 mg of water per tube, respectively. From the above results, it is concluded that the invention displacement liquid left less than 1/28 as much water in and on the reed switch tubes as did the art liquid.

C. Employing the described solutions, the displacement of water from between glass spheres (470 microns in diameter) was carried out. The following results were obtained (at a conc. of 0.064 wt. percent surfactant):

| | Water Displaced (%) | |
|---|---|---|
| Displacement Liquid | 0.5 min. | 5 min. |
| Art Composition | 13 | 48 |
| Invention Composition | 30 | 97.5 |

EXAMPLE 16

This Example demonstrates that the presence of alcohols of up to about 6 carbon atoms, which are useful in separating a water phase in those occasional cases when the compositions of the invention fail quickly to separate into two phases, are without serious effect on the water displacement properties of the compositions.

A. To the invention composition of Example 15 was added 4 percent by weight of ethanol and this azeotropic mixture was used to displace water from reed switch tubes in the manner of Example 15, Part B. Water, amounting to 14 ppm was found in the absolute methanol, corresponding to 0.022 mg of water per switch.

B. In the manner of part A of this Example, 1/16 inch polymethacrylate molding pellets were dried by displacement employing the same mixture. 1.3 mg of water remained on each pellet.

C. ¼-Inch stainless steel nuts were similarly dried with the invention liquid of Example 15 containing 4 percent by weight of various alcohols, with the following results:

| Alcohol | Residual Water (mg/nut) |
|---|---|
| Ethanol | 0.26 |
| Isopropanol | 0.12 |
| 2-methylbutanol | 0.19 |
| n-Octanol | 1.0 |

EXAMPLES 17 to 19

These Examples demonstrate that the principle of this invention is applicable to other solvents within the definition. The compound, 1,1,2,2-tetrachloro-1,2-difluoroethane, being a solid at room temperature, was tested at 30°C. Materials depressing the melting point of the fluorinecontaining compound can be used in admixture therewith. Such materials include the alcohols and azeotropes described earlier. The test results are as follows.

| | Solvent | Surfactant of | Wt.% | Water Displacement Index |
|---|---|---|---|---|
| Ex. 17 | 1,1,2,2-tetrachloro-1,2-difluoroethane | Ex. 14, Table 2 | (0.51) | 100 |
| Ex. 18 | 1,1,2,2-tetrachloro-1,2-difluoroethane | Ex. 1, Table 2 | (0.51) | 93 |
| Ex. 19 | Trichlorofluoromethane | Ex. 1, Table 2 | (0.54) | 83 |

EXAMPLES 20 to 27 (Also Shows Comparison)

These Examples summarized in Table 3 below show interfacial tension, water displacement and water solubilization for several compositions of the invention and for several prior art compositions (designated as comparisons).

TABLE 3

| Example or Comparison | Surfactant | Solvent | Interfacial Tension (Dynes/cm) (0.064 wt.%) Surfactant | Water Displacement (Vol. %) (0.5 wt. % Sol.) 5 Min. | Water Solubilization Index |
|---|---|---|---|---|---|
| Example 20 | [i—$C_8H_{17}O(CH_2CH_2O)_2$]$_{1.5}$P$^-O_{2.5}$-[n—$C_8H_{17}NH_3$]$^+_{1.5}$ | $CCl_2F$—$CClF_2$ | 4 | 97 | 556 |
| Example 21 | [i—$C_8H_{17}O(CH_2CH_2O)_2$]$_{1.5}$P$^-O_{2.5}$-[$C_6H_5NH_2(CH_3)$]$^+_{1.5}$ | $CCl_2F$—$CClF_2$ | 5 | 93 | 274 |
| Example 22 | [i—$C_8H_{17}O(CH_2CH_2O)_2$]$_{1.5}$P$^-O_{2.5}$-[$CH_3CH_2CH_2)_3NH$]$^+_{1.5}$ | $CCl_2F$—$CClF_2$ | 3 | 85 | 102 |
| Example 23 | [i—$C_8H_{17}O(CH_2CH_2O)_2$]$_{1.5}$P$^-O_{2.5}$-[$C_6H_5NH(CH_3)_2$]$^+_{1.5}$ | $CCl_2F$—$CClF_2$ | 4 | 90 | 283 |
| Example 24 | [i—$C_8H_{17}O(CH_2CH_2O)_2$]$_{1.5}$P$^-O_{2.5}$-[$C_{12}H_{25}N(C_2H_5)_2$]$^+_{1.5}$ | $CCl_2F$—$CClF_2$ | 5 | 92 | — |
| Example 25 | [i—$C_8H_{17}O(CH_2CH_2O)_2$]$_{1.5}$P$^-O_{2.5}$-[n—$C_8H_{17}NH_3$]$^+_{1.5}$ | $CCl_3F$ | 5 | 100$^{(1)}$ | — |
| Example 26 | [i—$C_8H_{17}O(CH_2CH_2O)_2$]$_{1.5}$P$^-O_{2.5}$-[n—$C_8H_{17}NH_3$]$^+_{1.5}$ | $CCl_2F$—$CClF_2$ | 5 | 97 | — |
| Comparison G | [$C_{13}H_{27}O$]$_{1.5}$P$^-O_{2.5}$[n—$C_8H_{17}NH_3$]$^+_{1.5}$ | $CCl_2F$—$CClF_2$ | 14 | <3 | — |
| Comparison H | [$C_8H_{17}O$]$_{1.5}$P$^-O_{2.5}$[$CH_3(CH_2)_3CH-(C_2H_5)CH_2NH_3$]$^+_{1.5}$ | $CCl_2F$—$CClF_2$ | 11 | <3 | 91 |
| Comparison I | Mixed Mono- and Di- $C_{8-16}$ Alcohol Phosphates | $CCl_2F$—$CClF_2$ | — | 90 | 1687 |
| Comparison J | Sodium Dioctyl Sulfosuccinate | $CCl_2F$—$CClF_2$ | 4 | 97 | 1600 |
| Comparison K | Sodium Di-tridecyl Sulfosuccinate | $CCl_2F$—$CClF_2$ | — | <3 | — |
| Comparison L | isopropylammonium dodecylbenzenesulfonate | $CCl_2F$—$CClF_2$ | 12$^{(2)}$ | 47 | 3292 |
| Comparison M | isobutylammonium dodecylbenzenesulfonate | $CCl_2F$—$CClF_2$ | 4$^{(3)}$ | 57 | 781 |
| Comparison N | Hexylammonium 2-[2-(dodecylphenoxy)ethoxy]ethyl sulfate | $CCl_2F$—$CClF_2$ | — | 45 | — |
| Example 27 | Dodecylammonium 2-[2-(2-[dodecylphenoxy]ethoxy)ethoxy]-ethyl sulfate | $CCl_2F$—$CClF_2$ | 3 | 90 | 711 |
| Example 28 | [i—$C_8H_{17}O(CH_2CH_2O)_2$]$_{1.5}$P$^-O_{2.5}$-[$CH_3CH_2CH_2NH_3$]$^+_{1.5}$ | $CCl_2F$—$CClF_2$ | 4 | 89 | 308 |
| Example 29 | [i—$C_8H_{17}O(CH_2CH_2O)_2$]$_{1.5}$P$^-O_{2.5}$-[$CH_3(CH_2)_3NH_3$]$^+_{1.5}$ | $CCl_2F$—$CClF_2$ | 4 | 87 | 601 |
| Comparison O | Sodium $C_{12-16}$ Alcohol Sulfates | $CCl_2F$—$CClF_2$ | — | 3 | — |
| Comparison P | Perfluorooctanoic acid | $CCl_2F$—$CClF_2$ | 27 | 77 | 140 |

That the combinations of the invention cannot be usefully described in terms other than those of the definition is shown by the following discussion. Examples 20 to 26, amine salts of mono- and di-alkyl poly(oxyalkylene) phosphates, possess interfacial tensions of less than about 5 dynes/cm and all displace water very well. Comparisons G and H, amine salts of mono- and di-alkyl phosphates, possess much higher interfacial tensions and displace water very poorly. The comparison is more striking when it is considered that the esterifying alkyl groups of Comparison G has 13 atoms in the chain and the composition has poor water displacement properties whereas the esterifying alkyl poly(oxyalkylene) group of Example 20 contains almost the same total number of chain atoms (15) in the chain, and possesses excellent displacement properties.

Similarly, the surfactant of Comparison L and Example 27 have similar anions related to dodecylbenzenesulfonate, yet that of Example 27 displaces water very well whereas that of Comparison L does not.

Comparison I, a combination of Burt et al., possesses a high interfacial tension and is, relative to the combinations of the invention, a poor displacement liquid. Comparison K, a combination of Bauer et al., displaces water poorly. The combination solubilizes excessive amounts of water. Comparison P is a combination of Zisman et al., U.S. Pat. No. 3,509,061. The compositions, Comparisons I and J have been recommended as cleaning and sometimes as drying-by-solubilization mixtures. In the uses contemplated by this invention, the compositions solubilize excessive amounts of water.

EXAMPLE 30 (For Comparative Purposes)

This Example compares in practical tests the water displacement performance of a preferred composition of this invention, that of Example 20, with the performance of a liquid (Comparison I) outside the invention. The combination of Comparison I solubilizes excessive amounts of water and this property appears to explain its poor performance in the test of this Example.

Stainless steel nuts (¼ inch) were wetted with water and placed for 30 seconds in boiling displacement liquids consisting of 1,1,2-trichloro-1,2,2-trifluoroethane having dissolved therein to the extent of 0.064 wt. %, in the first liquid, [i-$C_8H_{17}O(CH_2CH_2O)_2$]$_{1.5}$PO$^-_{2.5}$[n-$C_{18}H_{17}NH_3$]$^+_{1.5}$ and, in the second liquid, mixed mono- and di- $C_{8-16}$ alcohol phosphates. Thereafter, the articles were placed for 30 seconds in pure 1,1,2-trichloro-1,2,2-trifluoroethane thus approximating a commercial operation. The rinsed articles were immediately transferred to absolute methanol of known water content as determined by the Karl Fischer Method to remove by solution any water remaining on the nuts. The total amount of water in the methanol was then determined by the Karl Fischer Method. By calculation of difference, it was found that the novel composition of this invention displaced all the water except for 0.07 mg per nut whereas the prior art liquid left behind 0.3 mg per nut.

EXAMPLES 31 to 35 (Also Shows Comparison)

Table 4 presents data in several Examples as well as data on several compositions of the art labeled as comparisons.

TABLE 4

| Example or Comparison | Surfactant | Solvent | Interfacial Tension (Dynes/cm) (0.064 wt.%) Surfactant | Water Displacement (Vol %) (0.5 wt.% Surf.) 5 Min. | Water Solubilization Index |
|---|---|---|---|---|---|
| Example 31 | Block copolymer comprising poly dimethyl siloxane blocks and poly(oxyalkylene)blocks | $CCl_2F$—$CClF_2$ | 6 | 87 | 89 |
| Comparison Q | G.E. Silicone Surfactant F—1066 | $CCl_2$—F—$CClF_2$ | — | 27 | — |
| Example 32 | Block copolymer comprising poly dimethyl siloxane blocks and poly(oxyalkylene)blocks | $CCl_2F$—$CllF_2$ | 5 | 83 | 95 |
| Example 33 | $F(CF_2CF_2)_{2-8}CH_2CH_2O(CH_3CH_2O)_{20}H$ | $CCl_2F$—$CClF_2$ | 2 | 87 | 87 |
| Comparison R | $H(OCH_2CH_2)_{2.2}(OC(CH_3)CH_2)_{30.1}$—$(OCH_2CH_2)_{2.2}OH$ | $CCl_2F$—$CClF_2$ | 10 | 50 | 61 |
| Example 34 | $H(OCH_2CH_2)_{5.0}(OC(CH_3)CH_2)_{30.1}$—$(OCH_2CH_2)_{5.0}OH$ | $CCl_2F$—$CClF_2$ | 6 | 87 | 102 |
| Example 35 | Poly(Oxy-Ethylene, -Propylene)—Polyol | $CCl_2F$—$CClF_2$ | 4 | 87 | 90 |
| Comparison S | $C_{18}H_{35.37}O(CH_2CH_2O)_{1.5}H$ | $CCl_2F$—$CClF_2$ | 15 | 20 | — |
| Comparison T | $F[CF(CF_3)CF_2O]_9CF(CF_3)CO(OCH_2$—$CH_2)_2OCH_3$ | $CCl_2F$—$CClF_2$ | — | 17 | — |
| Example 36 | Homogeneous mixture of modified ethoxylates "Triton" DF—20 | $CCl_2F$—$CClF_2$ | 4 | 87 | 101 |
| Example 37 | $F[CF(CF_3)CF_2O]_2CF(CF_3)CONH$—$(CH_2)_3N^+(CH_2)_3COO$— | $CCl_2F$—$CClF_2$ | 6 | 87 | — |

Surfactants of Examples 31 and 32 are block copolymers wherein at least one block is a silicone polymer and at least one other block is a polymer selected from the group of poly($C_{2-4}$ oxyalkylenes). Surfactants of this group are described in Schick, Nonionic Surfactants, Vol. 1 of Surfactant Science Series, Marcel Dekker Inc., New York, N.Y. (1967).

The surfactant of Example 33 is derived from fluorinated alcohols having the structure, $F(CF_2CF_2)_nCH_2CH_2OH$. Such alcohols can be prepared by the methods of Pierce et al. J. Am. Chem. Soc. 75 5618 (1953), of Park et al. J. Org. Chem. 23 1166 (1958) or according to a method disclosed by Fasick et al. in U.S. Pat. No. 3,378,609. The surfactant is prepared by reaction of the alcohol(s) with ethylene oxide according to well known methods such as those of Schoeller et al. U.S. Pat. No. 1,970,578 and Schuette et al. U.S. Pat. No. 2,174,761.

EXAMPLE 38 (For Comparative Purposes)

This Example demonstrates in practical water displacement tests the good performance of liquids falling within the invention definition and the poor performance of liquids falling outside that definition.

Stainless steel nuts (¼ inch), poly(methylmethacrylate) molding pellets (1/16 inch) and poly(butene) molding pellets (1/16 inch) were wetted with water and placed for 30 seconds in boiling displacement liquids consisting of 1,1,2-trichloro-1,2,2-trifluoroethane and, dissolved therein, the surfactants shown in Table 5 below at a concentration of 0.064 wt. %. Thereafter, the articles were placed for 30 seconds in pure room temperature 1,1,2-trichloro-1,2,2-trifluoroethane thus approximating a commercial process. The rinsed articles were immediately transferred to absolute methanol of known water content as determined by the Karl Fischer Method to remove by solution any water remaining in or on the articles. The total amount of water in the methanol was then determined by the Karl Fischer Method. By calculation of difference, the following results were obtained.

TABLE 5

| | Water Remaining Pellets (mg/g) | | |
|---|---|---|---|
| Surfactant | Nuts (mg $H_2O$/Nut) | Poly(Methylmethacrylate) | Poly (Butene) |
| of Example 31 | 0.15 | — | 2.4 |
| of Example 32 | 0.56 | — | — |
| of Comparison R | 7.4 | — | 4.7 |
| of Example 34 | 0.49 | — | 2.3 |
| of Example 35 | 1.4 | 0.64 | — |
| of Comparison S | 11 | — | — |

EXAMPLES 39 and 40

The compositions of Examples 31 and 34 were employed as in Example 34 above except that 4 wt. percent alcohol (ethanol) was added to the solvent. The amount of water in mg per nut was measured at 0.15 and 0.10, respectively.

The embodiments of the invention in which an exclusive property or privelege is claimed are defined as follows:

1. A liquid water-displacement composition comprising
  A. a fluorine-containing compound having i) solubility parameter less than about 8, ii) density of at least about 1.3 g/cc at room temperature, and iii) a boiling point above about 20°C., and
  B. at least one surfactant selected from one of the groups consisting of cationic, anionic and nonionic/amphoteric surfactants, said surfactant dissolved in (A) to the extent of about 0.01 to 5 percent by weight of the combination,
  said composition characterized by an interfacial tension with water of up to about 6 dynes/cm, a water-displacement index of above about 80 percent and a water-solubilization index of less than about 750 ppm.

2. A composition according to claim 1, wherein the fluorine-containing compound is selected from at least one member of the group consisting of
poly(hexafluoropropylene oxide), 1H-tetrafluoroethyl terminated hexafluoro-1,2-bis(trifluoromethyl)cyclobutane and -1,3-isomer 2,2-dichlorohexafluoropropane Heptafluoropropyl 1H-tetrafluoroethyl ether
1,2,2-trichloropentafluoropropane
Octafluoro-4-(trifluoromethyl)morpholine
2,3-dichlorooctafluorobutane
3,4-dichlorohexafluorotetrahydrofuran
1,1,2-trichloro-1,2,2-trifluoroethane
1,2-dichlorohexafluorocyclobutane and -1,3-isomer trichlorofluoromethane, and
1,1,2,2-tetrachloro-1,2-difluoroethane.

3. A composition according to claim 2 wherein the fluorine-containing compound is 1,1,2-trichloro1,2,2-trifluoroethane.

4. A composition according to claim 1, wherein the surfactant is a cationic surfactant.

5. A composition according to claim 4 containing additionally from about 0.2 to 5 weight percent of a $C_1$ to $C_6$ mono-alcohol.

6. A composition according to claim 5 additionally containing a denaturant.

7. A composition according to claim 6 containing about 3.75 weight percent of a mixture of about 91% ethanol and 9% methanol.

8. A composition according to claim 4 wherein the cationic surfactant is selected from the imidazoline moiety wherein $R^1$ is alkyl or alkenyl containing from about 10 to 20 carbon atoms, $R^2$ is hydroxyalkyl of the structure $—(CH_2)_nOH$, or amido-alkyl of the structure $—(CH_2)_nNHOCR^3$, $R^3$ is alkyl or alkenyl of from about 10 to 20 carbon atoms, and $n$ is an integer from about 2 to 6, and said imidazoline moiety combined with one and with two carboxylate moieties, $R^1COO^-$, $R^1$ being as defined above.

9. A composition according to claim 8 wherein the cationic surfactant is the imidazoline moiety.

10. A composition according to claim 8 wherein the cationic surfactant is selected from the imidazoline moiety combined with one, and the imidazoline moiety combined with two carboxylate moieties.

11. A composition according to claim 8 wherein the surfactant is selected from the group 1-(2-hydroxyethyl)-2-($C_{17}H_{33}$)-2-imidazoline mono oleate
1-(2-hydroxyethyl)-2-($C_{17}H_{31-35}$)-2-imidazoline
1-(2-hydroxyethyl)-2-($C_{17}H_{31-35}$)-2-imidazoline mono acetate
1-(2-hydroxyethyl)-2-($C_{17}H_{31-35}$)-2-imidazoline mono n-octanoate
1-(2-hydroxyethyl)-2-($C_{17}H_{31-35}$)-2-imidazoline di n-octanoate
1-(2-hydroxyethyl)-2-($C_{17}H_{31-35}$)-2-imidazoline mono n-butyrate
1-(2-hydroxyethyl)-2-($C_{17}H_{31-35}$)-2-imidazoline di n-butyrate
1-(2-hydroxyethyl)-2-($C_{17}H_{31-35}$)-2-imidazoline mono n-heptanoate
1-(2-hydroxyethyl)-2-($C_{17}H_{31-35}$)-2-imidazoline di n-heptanoate
1-(2-hydroxyethyl)-2-($C_{17}H_{31-35}$)-2-imidazoline mono n-decanoate
1-(2-hydroxyethyl)-2-($C_{17}H_{31-35}$)-2-imidazoline mono n-laurate
1-(2-hydroxyethyl)-2-($C_{17}H_{31-35}$)-2-imidazoline mono pelargonate
1-($C_{17}H_{31-35}$-CONHCH$_2$CH$_2$-)-2-($C_{17}H_{31-35}$)-2-imidazoline, and
$C_{17}H_{33}CONHCH_2CH_2NHCH_2CH_2OH$.

12. A composition according to claim 11 wherein the surfactant is 1-(2-hydroxyethyl)-2-($C_{17}H_{33}$)-2-imidazoline oleate.

13. A composition according to claim 11 wherein the surfactant is $C_{17}H_{33}CONHCH_2CH_2NHCH_2CH_2OH$.

14. A composition according to claim 12 wherein the fluorine-containing compound is 1,1,2-trichloro-1,2,2-trifluoroethane.

15. A composition according to claim 14 containing from about 0.2 to 5 percent by weight of ethanol.

16. A composition according to claim 13 wherein the fluorine-containing compound is 1,1,2-trichloro-1,2,2-trifluoroethane.

17. A composition according to claim 16 containing from about 0.2 to 5 percent by weight ethanol.

18. A composition according to claim 1 wherein the surfactant is anionic.

19. A composition according to claim 18 containing additionally from about 0.2 to 5 weight percent of a $C_1$ to $C_6$ mono-alcohol.

20. A composition according to claim 19 additionally containing a denaturant.

21. A composition according to claim 20 containing about 3.75 weight percent of a mixture of about 91% ethanol and 9% methanol.

22. A composition according to claim 18 wherein the surfactant is selected from the group $[i-C_8H_{17}O(CH_2CH_2O)_2]_{1.5}P^-O_{2.5}[n-C_8H_{17}NH_3]^+_{1.5}$
$[i-C_8H_{17}O(CH_2CH_2O)_2]_{1.5}P^-O_{2.5}[C_6H_5NH_2(CH_3)]^+_{1.5}$
$[i-C_8H_{17}O(CH_2CH_2O)_2]_{1.5}P^-O_{2.5}[CH_3CH_2CH_2)_3]NH^+_{1.5}$
$[i-C_8H_{17}O(CH_2CH_2O)_2]_{1.5}P^-O_{2.5}[C_6H_5NH(CH_3)_2]^+_{1.5}$
$[i-C_8H_{17}O(CH_2CH_2O)_2]_{1.5}P^-O_{2.5}[C_{12}H_{25}N(C_2H_5)_2]^+_{1.5}$
$[i-C_8H_{17}O(CH_2CH_2O)_2]_{1.5}P^-O_{2.5}[n-C_8H_{17}NH_3]^+_{1.5}$, and
$[i-C_8H_{17}O(CH_2CH_2O_2]_{1.5}P^-O_{2.5}[n-C_8H_{17}NH_3]^+_{1.5}$.

23. A composition according to claim 22 wherein the surfactant is $[i-C_8H_{17}O(CH_2CH_2O)_2]_{1.5}P^-O_{2.5}[n-C_8H_{17}NH_3]^+_{1.5}$.

24. A composition according to claim 23 wherein the fluorine-containing compound is 1,1,2-trichloro-1,2,2-trifluoroethane.

25. A composition according to claim 24 containing additionally from about 0.2 to 5 weight percent ethanol.

26. A composition according to claim 1 wherein the surfactant is selected from the group nonionic and amphoteric.

27. A composition according to claim 26 wherein the surfactant is nonionic.

28. A composition according to claim 27 wherein the fluorine-containing compound is 1,1,2-trichloro-1,2,2-trifluoroethane.

29. A composition according to claim 28 containing additionally from about 0.2 to 5 weight percent of a $C_1$ to $C_6$ mono-alcohol.

30. A composition according to claim 29 additionally containing a denaturant.

31. A composition according to claim 30 containing about 3.75 weight percent of a mixture of about 91% ethanol and 9% methanol.

32. A composition according to claim 26 wherein the surfactant is amphoteric.

33. A composition according to claim 32 wherein the fluorine-containing compound is 1,1,2-trichloro-1,2,2-trifluoroethane.

34. A composition according to claim 33 containing additionally from about 0.2 to 5 weight percent of a $C_1$ to $C_6$ mono-alcohol.

35. A composition according to claim 34 additionally containing a denaturant.

36. A composition according to claim 35 containing about 3.75 weight percent of a mixture of about 91% ethanol and 9% methanol.

* * * * *